US012464387B2

(12) United States Patent
He et al.

(10) Patent No.: US 12,464,387 B2
(45) Date of Patent: Nov. 4, 2025

(54) BEAM MEASUREMENT RELAXATION CRITERIA AND CONFIGURATION

(71) Applicant: QUALCOMM Incorporated, San Diego, CA (US)

(72) Inventors: Linhai He, San Diego, CA (US); Chu-Hsiang Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 17/930,297

(22) Filed: Sep. 7, 2022

(65) Prior Publication Data

US 2023/0111244 A1    Apr. 13, 2023

Related U.S. Application Data

(60) Provisional application No. 63/262,263, filed on Oct. 8, 2021.

(51) Int. Cl.
*H04W 24/08* (2009.01)
(52) U.S. Cl.
CPC .................................. *H04W 24/08* (2013.01)
(58) Field of Classification Search
CPC .................................................... H04W 24/08
See application file for complete search history.

(56) References Cited

U.S. PATENT DOCUMENTS

2022/0322234 A1\* 10/2022 Niu .................... H04W 52/0274

FOREIGN PATENT DOCUMENTS

WO    WO-2021175126 A1 \*  9/2021  ............ H04W 24/08

OTHER PUBLICATIONS

Huawei., et al., "Further Discussion on RLM/BFD Measurement Relaxation", 3GPP TSG-RAN WG4 Meeting #100-e, R4-2113820, 3rd Generation Partnership Project, Mobile Competence Centre, 650, Route Des Lucioles, F-06921 Sophia-Antipolis Cedex, France, vol. RAN WG4, No. Electronic Meeting, Aug. 16, 2021-Aug. 27, 2021, Aug. 6, 2021, pp. 1-6, XP052037226, Section 2, pp. 1-5.
International Search Report and Written Opinion—PCT/US2022/076121—ISA/EPO—Dec. 16, 2022.

\* cited by examiner

*Primary Examiner* — Samina F Choudhry
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, an indication of a relaxation criterion associated with one or more reference signals used in performing at least one of radio link monitoring (RLM) or beam failure detection (BFD), wherein the relaxation criterion includes a mobility condition associated with the UE. The UE may perform, based at least in part on satisfying the mobility condition, one or more measurements using one or more of the reference signals and based at least in part on the relaxation criterion. Numerous other aspects are described.

30 Claims, 11 Drawing Sheets

BEAM MEASUREMENT RELAXATION CRITERIA AND CONFIGURATION

CROSS-REFERENCE TO RELATED APPLICATION

This patent application claims priority to U.S. Provisional Patent Application No. 63/262,263, filed on Oct. 8, 2021, entitled "BEAM MEASUREMENT RELAXATION CRITERIA AND CONFIGURATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for beam measurement relaxation criteria and configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, an indication of a relaxation criterion associated with one or more reference signals used in performing at least one of radio link monitoring (RLM) or beam failure detection (BFD), wherein the relaxation criterion includes a mobility condition associated with the UE. The method may include performing, based at least in part on satisfying the mobility condition, one or more measurements using one or more of the reference signals and based at least in part on the relaxation criterion.

Some aspects described herein relate to a method of wireless communication performed by a network node. The method may include transmitting, to a UE, an indication of a relaxation criterion that is associated with one or more reference signals and that indicates a mobility condition associated with the UE. The method may include transmitting the one or more reference signals for at least one of RLM or BFD.

Some aspects described herein relate to an apparatus for wireless communication performed by a UE. The apparatus may include a memory and one or more processors, coupled to the memory. The one or more processors may be configured to receive, from a network node, an indication of a relaxation criterion associated with one or more reference signals used in performing at least one of RLM or BFD, wherein the relaxation criterion includes a mobility condition associated with the UE. The one or more processors may be configured to perform, based at least in part on satisfying the mobility condition, one or more measurements using one or more of the reference signals and based at least in part on the relaxation criterion.

Some aspects described herein relate to an apparatus for wireless communication performed by a network node. The apparatus may include a memory and one or more processors, coupled to the memory. The one or more processors may be configured to transmit, to a UE, an indication of a relaxation criterion that is associated with one or more reference signals and that indicates a mobility condition associated with the UE. The one or more processors may be configured to transmit the one or more reference signals for at least one of RLM or BFD.

Some aspects described herein relate to a non-transitory computer-readable medium that stores a set of instructions for wireless communication by a UE. The set of instructions, when executed by one or more processors of the UE, may cause the UE to receive, from a network node, an indication of a relaxation criterion associated with one or more reference signals used in performing at least one of RLM or BFD, wherein the relaxation criterion includes a mobility condition associated with the UE. The set of instructions, when executed by one or more processors of the UE, may cause the UE to perform, based at least in part on satisfying the mobility condition, one or more measurements using one or more of the reference signals and based at least in part on the relaxation criterion.

Some aspects described herein relate to a non-transitory computer-readable medium that stores a set of instructions for wireless communication by a network node. The set of instructions, when executed by one or more processors of the network node, may cause the network node to transmit, to a UE, an indication of a relaxation criterion that is associated with one or more reference signals and that indicates a mobility condition associated with the UE. The set of instructions, when executed by one or more processors of the network node, may cause the network node to transmit the one or more reference signals for at least one of RLM or BFD.

Some aspects described herein relate to an apparatus for wireless communication. The apparatus may include means for receiving, from a network node, an indication of a relaxation criterion associated with one or more reference signals used in performing at least one of RLM or BFD, wherein the relaxation criterion includes a mobility condition associated with the apparatus. The apparatus may include means for performing, based at least in part on satisfying the mobility condition, one or more measurements using one or more of the reference signals and based at least in part on the relaxation criterion.

Some aspects described herein relate to an apparatus for wireless communication. The apparatus may include means for transmitting, to a UE, an indication of a relaxation criterion that is associated with one or more reference signals and that indicates a mobility condition associated with the UE. The apparatus may include means for transmitting the one or more reference signals for at least one of RLM or BFD.

Aspects generally include a method, apparatus, system, computer program product, non-transitory computer-readable medium, user equipment, network node, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
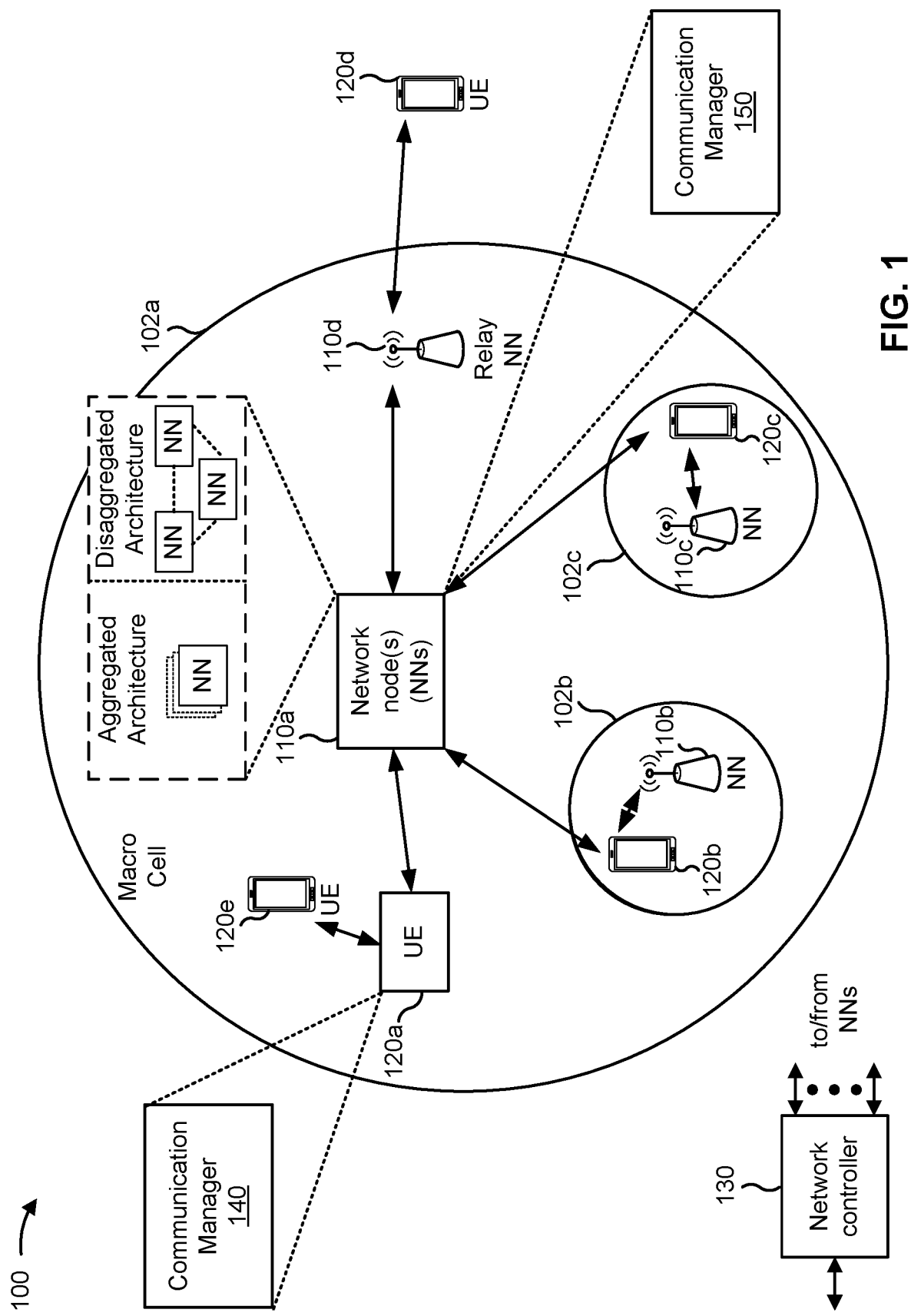
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LIE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from the network node 110, an indication of a relaxation criterion associated with one or more reference signals used in performing at least one of RLM or BFD, wherein the relaxation criterion includes a mobility condition associated with the UE 120; and perform, based at least in part on satisfying the mobility condition, one or more measurements using one or more of the reference signals and based at least in part on the relaxation criterion. Additionally, or alternatively, the communication manager 140 may perform one or more other operations described herein.

In some aspects, the network node 110 may include a communication manager 150. As described in more detail elsewhere herein, the communication manager 150 may transmit, to the UE 120, an indication of a relaxation criterion that is associated with one or more reference signals and that indicates a mobility condition associated with the UE 120; and transmit the one or more reference signals for at least one of RLM or BFD. Additionally, or alternatively, the communication manager 150 may perform one or more other operations described herein.

As indicated above, FIG. 1 is provided as an example. Other examples may differ from what is described with regard to FIG. 1.

Figure 2:
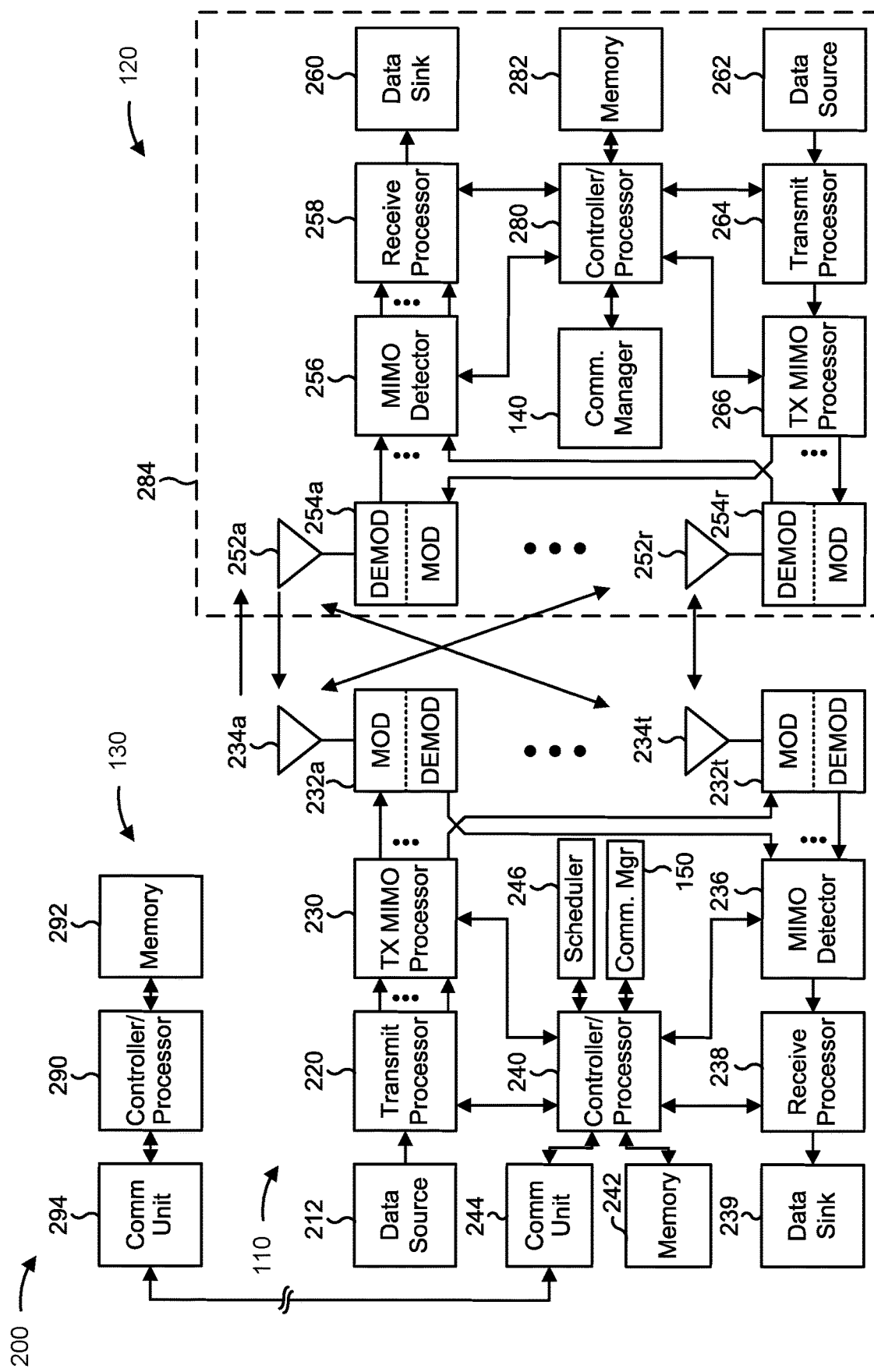
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with beam measurement relaxation criteria and configuration, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from the network node 110, an indication of a relaxation criterion associated with one or more reference signals used in performing at least one of RLM or BFD, wherein the relaxation criterion includes a mobility condition associated with the UE 120; and/or means for performing, based at least in part on satisfying the mobility condition, one or more measurements using one or more of the reference signals and based at least in part on the relaxation criterion. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to the UE 120, an indication of a relaxation criterion that is associated with one or more reference signals and that indicates a mobility condition associated with the UE 120; and/or means for transmitting the one or more reference signals for at least one of RLM or BFD. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
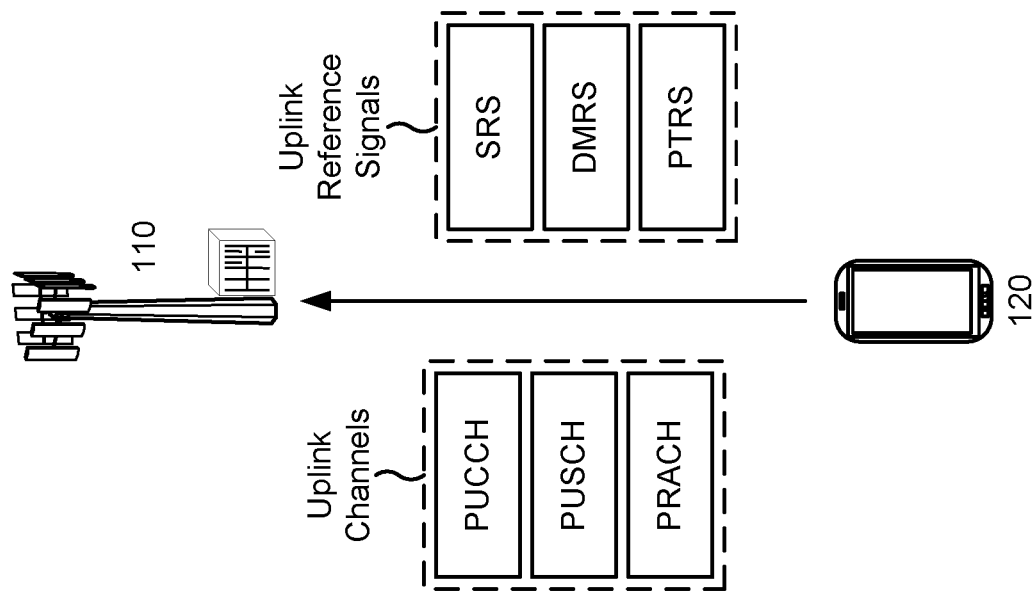
FIG. 3 is a diagram illustrating an example of physical channels and reference signals in a wireless network, in accordance with the present disclosure.
Figure 3:
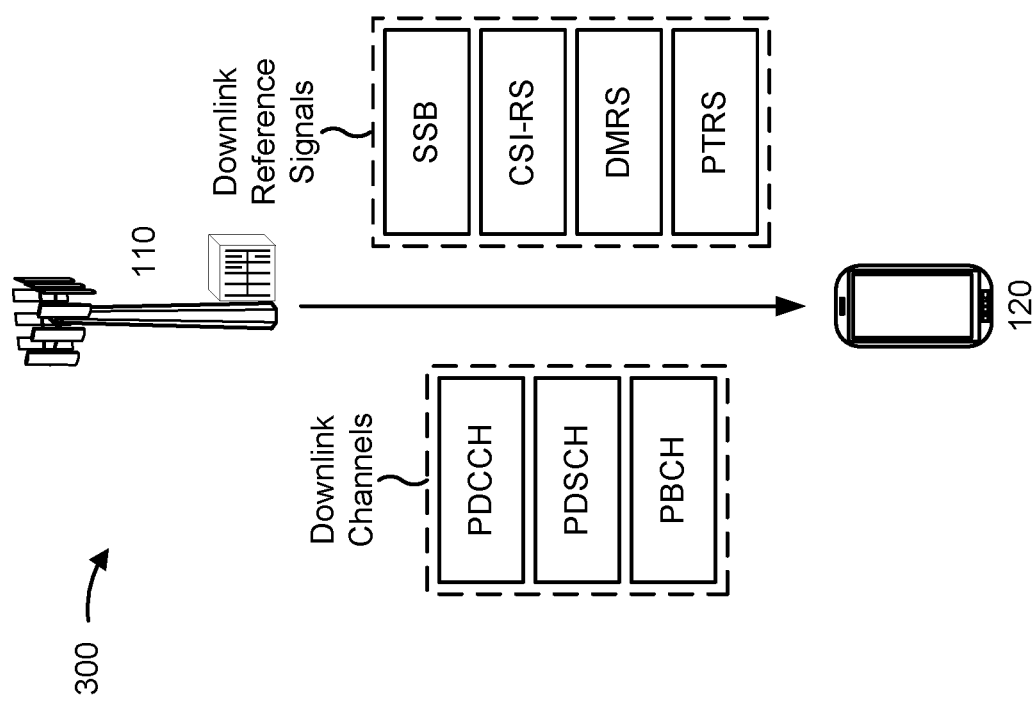

FIG. 3 is a diagram illustrating an example 300 of physical channels and reference signals in a wireless network, in accordance with the present disclosure. As shown in FIG. 3, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based at least in part on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based at least in part on OTDOA measurements associated with the PRSs received from the multiple cells. In some aspects, the network node 110 may then calculate a position of the UE 120 based at least in part on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As described herein, the network node 110 and the UE 120 may perform one or more beam management procedures using one or more of the reference signals described above, including but not limited to the SSB and the CSI-RS.

As indicated above, FIG. 3 is provided as an example. Other examples may differ from what is described with regard to FIG. 3.

Figure 4:
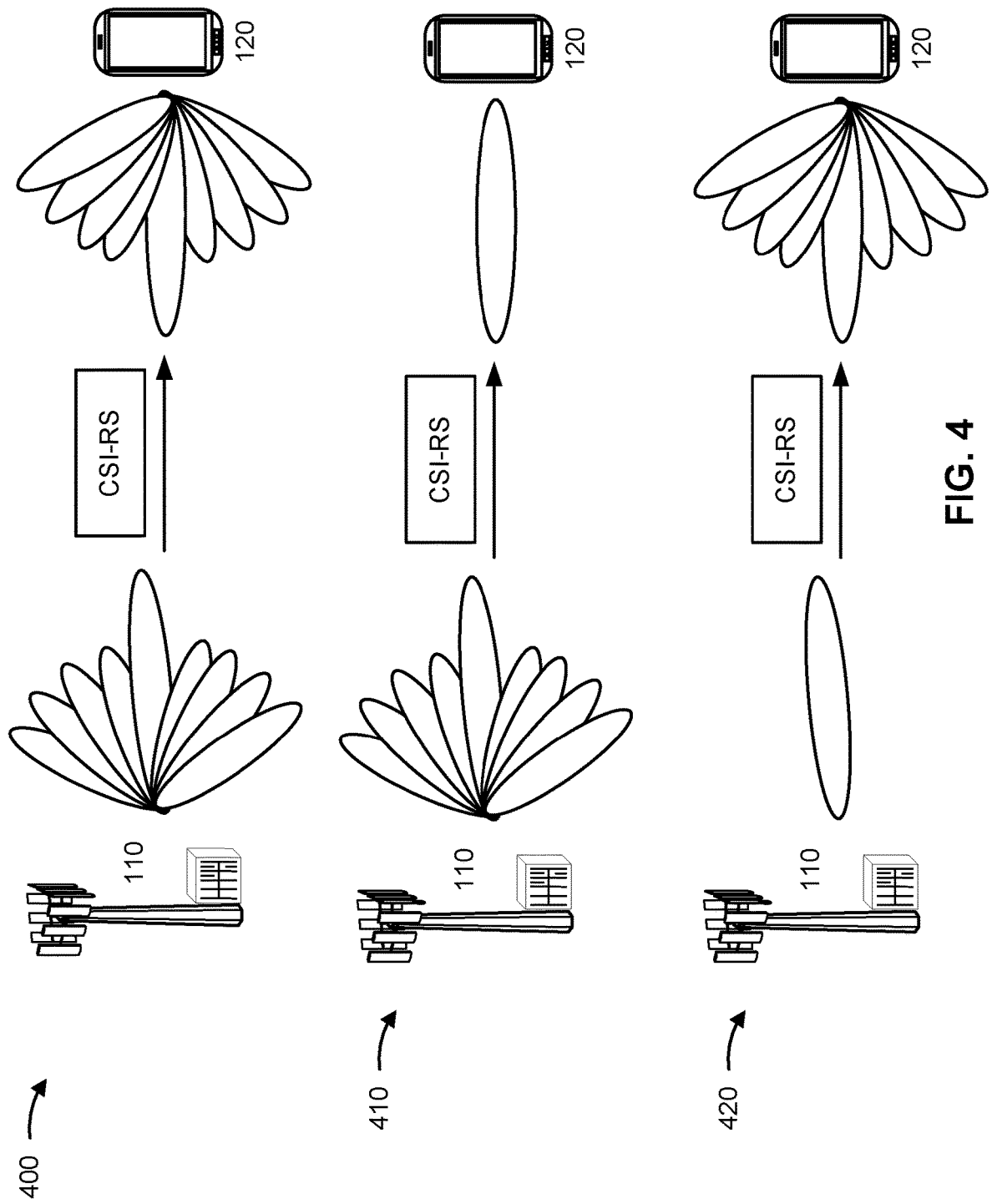
FIG. 4 is a diagram illustrating an example of beam management procedures, in accordance with the present disclosure.

FIG. 4 is a diagram illustrating example beam management procedures 400, 410, and 420, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or transmit receive point (TRP), between a mobile termination node and a control node, between an integrated access and backhaul (IAB) child node and an IAB parent node, and/or between a scheduled node and a scheduling node). In some aspects, the UE 120 and the network node 110 may be in a connected state (e.g., a radio resource control (RRC) connected state).

As shown in FIG. 4, example 400 may include a network node 110 and a UE 120 communicating to perform beam management (e.g., using CSI-RSs). Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120.

As shown in FIG. 4, example 410 may include a network node 110 and a UE 120 communicating to perform beam management (e.g., using CSI-RSs). Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 410 may include a network node 110 and a UE 120 communicating to perform beam management (e.g., using CSI-RSs). Example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

While the example beam management procedures 400, 410, and 420 have been described above in connection with CSI-RSs, the beam management procedures may be performed using one or more other reference signals, including but not limited to SSBs. For example, an SSB may carry information used for initial network acquisition and synchronization, such as a PSS, an SSS, a PBCH, and/or a PBCH DMRS. The network node 110 may transmit multiple SSBs on multiple corresponding beams, and the SSBs may be used for beam selection, in a similar manner as described above.

As described herein, a UE, such as the UE 120, may monitor a quality of one or more beams used for communicating with a network node, such as the network node 110. In some cases, the UE may perform radio link monitoring (RLM) to determine a quality of the one or more beams. If the quality of the one or more beams drops below a threshold, the UE may perform beam failure detection (BFD) and beam failure recovery (BFR) (as needed) in an attempt to recover the one or more beams.

In some cases, one or more thresholds may be defined for tracking radio link conditions. The thresholds may correspond, for example, to an RSRP and/or a block error rate (BLER) that indicates an in-sync condition and/or an out-of-sync condition of the radio link. An "out-of-sync" condition may indicate that the radio link condition is poor, whereas an "in-sync" condition may indicate that the radio link condition is acceptable, and that the UE is likely to receive a transmission transmitted on the radio link. An out-of-sync condition may be declared when a block error rate for the radio link falls below a threshold over a time interval (e.g., a 200 ms time interval). An in-sync condition may be declared when a block error rate for the radio link is better than a threshold over a second time interval (e.g., a 100 ms time interval). The thresholds and time intervals used to determine the in-sync condition and out-of-sync condition may be the same or may be different from each other. If the UE receives a number (e.g., greater than a threshold number) of out-of-sync measurements over a period of time, the UE may declare a beam failure.

When a beam failure is declared (e.g., detected), the UE may take appropriate actions to recover the connection. For example, after M RLM failure indications out of the last N measurement instances, the UE may trigger a radio link failure procedure to initiate recovery of the connection with the network node. In some cases, the UE may be configured by RRC signaling with a BFD procedure that is used to indicate to the network node that the beam failure has been detected. For example, an upper layer of the UE may use a state machine whose state is updated whenever a BFD indication is received from the physical (PHY) layer. A BFR procedure may be triggered based at least in part on the state machine reaching a termination state.

In some cases, the UE may be configured by a network node for discontinuous reception (DRX). During an RRC connected state, when there is no data transmission in either direction (UL/DL), the UE may transition to the DRX mode in which the UE discontinuously performs beam measurements (e.g., monitoring PDCCH channels) using a sleep and wake cycle. Without DRX, the UE may monitor the PDCCH in every subframe to check whether there is downlink data available for the UE. In contrast, in the DRX mode, when the UE is in a sleep portion of the cycle, the UE does not monitor for the PDCCH. In some cases, using DRX, the periodicity of measuring radio link quality measurements may be set to be the maximum between the shortest periodicity of reference signals in a set $q_0$ and the length of the DRX cycle for the UE. If the radio link quality measurements on all of the reference signals in the set $q_0$ drops below a threshold (e.g., $Q_{out}$), an indication may be sent from the PHY layer to the upper layer.

As described above, the UE may be configured to monitor a quality of one or more beams used for communicating with the network node. For example, the UE may use one or more reference signals, such as an SSB and/or a CSI-RS, in order to monitor one or more conditions of a beam. The UE may determine, based at least in part on the monitoring, whether the beam has a good radio link condition, such that the UE and the network node can reliably communicate using the beam, or a poor radio link condition, such that the UE and the network node may not be able to reliably communicate using the beam.

In some cases, the UE may perform RLM or BFD using the one or more reference signals in order to recover a failed beam and/or to discover a new beam for communicating with the network node. However, performing beam measurements using the one or more reference signals may require a number of resources of the UE. In particular, performing RLM or BFD using the one or more reference signals may consume battery power resources of the UE such that the battery life of the UE is reduced. This is especially true when the UE has limited battery power to begin with, such as in the example of a low-capability device. Furthermore, some devices may be stationary or substantially stationary for long periods of time, such that performing beam measurements at a relatively frequent periodicity may use significant battery power while the conditions at the UE are unlikely to change.

Techniques and apparatuses described herein may enable the UE to apply a relaxation criterion to beam measurements performed by the UE. In some aspects, it may not be necessary for a UE having low mobility to perform beam measurements, such as beam measurements associated with RLM or BFD, as often as a UE having high mobility needs to perform the beam measurements. A UE that is stationary, or substantially stationary, is less likely to experience beam failure as compared to a UE that moves around often. For example, a first UE that does not move around often (e.g., less than a threshold) may not need to update a reference signal used by the first UE for beam monitoring as frequently as a second UE that does move around often needs to update reference signals used by the second UE for beam monitoring. Therefore, the stationary, or limited mobility, UE may update one or more reference signals used by the UE for beam monitoring with less frequency (e.g., fewer times in a period) without significantly increasing a likelihood that the UE will experience a beam failure (e.g., due to reference signals that have not been updated).

In some aspects, the UE may receive an indication of a relaxation criterion associated with one or more reference signals, such as the one or more reference signals used in performing RLM or BFD. The relaxation criterion may indicate a mobility condition of the UE. For example, the relaxation criterion may indicate to reduce a frequency (e.g., number of times in a period) that the UE updates one or more reference signals used to perform beam measurements if the UE satisfies a mobility condition (e.g., if the UE is stationary or moves less than a threshold, as defined by various parameters described herein). The UE, based at least in part on satisfying the mobility condition, may perform one or more beam measurements, using one or more of the reference signals, with less frequency, in accordance with the relaxation criterion.

As described above, performing RLM or BFD using one or more reference signals consumes battery power resources of the UE, thereby decreasing a battery life of the UE. However, performing beam measurements in accordance with the relaxation criterion may reduce this power consumption. For example, the UE may apply the relaxation criterion to the one or more reference signals based at least in part on the UE satisfying a mobility condition, and may perform beam measurements less often, thereby requiring less power resources of the UE. Since the UE is not moving around often, the UE can update the one or more reference signals used by the UE with less frequency without increasing (or significantly increasing) a likelihood that the UE will experience a beam failure.

As indicated above, FIG. 4 is provided as an example. Other examples may differ from what is described with regard to FIG. 4.

Figure 5:
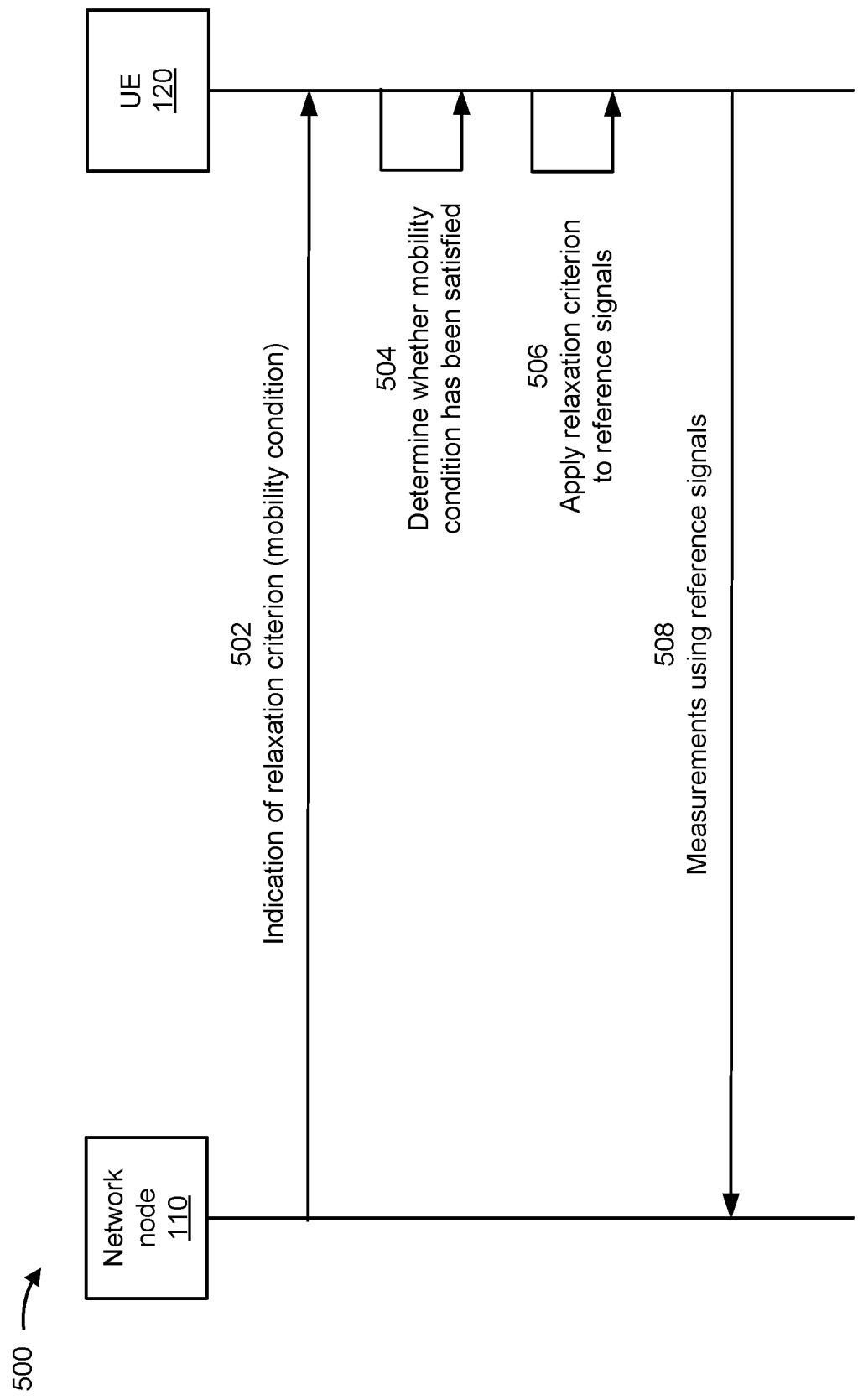
FIG. 5 is a diagram illustrating an example associated with beam measurement relaxation criteria and configuration, in accordance with the present disclosure.

FIG. 5 is a diagram illustrating an example 500 of beam measurement relaxation criteria and configuration, in accordance with the present disclosure.

As shown in connection with reference number 502, the network node 110 may transmit, and the UE 120 may receive, an indication of a relaxation criterion. In some aspects, the network node 110 may transmit the relaxation criterion in a configuration message, such as an RRC message (e.g., an RRC configuration message or an RRC reconfiguration message). The indication of the relaxation criterion may be associated with one or more reference signals, such as one or more reference signals (e.g., $q_0$) used in performing RLM or BFD. The relaxation criterion may indicate one or more mobility conditions associated with the UE 120. As described below in connection with reference number 504, the relaxation criterion may indicate to perform beam measurements with less frequency (e.g., fewer times in a period) if the UE 120 satisfies a mobility condition. For example, the relaxation criterion may indicate a number of measurements of a reference signal to be performed in a time period, a periodicity for performing one or more measurements of a reference signal (e.g., every other slot), and/or a scaling factor (e.g., a multiplier) to be applied to the one or more measurements, among other examples. The mobility condition may be based at least in part on one or more mobility parameters of the UE 120, such as how often the UE 120 moves, a distance moved by the UE 120 relative to the network node 110 within a time period, a change of orientation of the UE 120, a rate of change of orientation of the UE 120, a device type of the UE 120 (e.g., if the UE 120 is a stationary type of UE), a path along which the UE 120 is moving, how often a serving beam of the UE 120 changes, or a similar factor.

The UE 120 may be configured to monitor a quality of one or more beams for communicating with the network node 110 using one or more reference signals. Transmission and reception of the one or more reference signals may indicate whether the beam has a good radio link connection, such that the UE 120 and the network node 110 can reliably communicate using the beam, or a poor radio link connection, such that the UE 120 and the network node 110 may not be able to reliably communicate using the beam. The UE 120 may detect a poor radio link connection, and may perform RLM and/or BFD using the one or more reference signals in order to recover a failed beam or to discover a new beam for communicating with the network node 110.

In some aspects, the one or more reference signals may include an SSB or a CSI-RS. The SSB reference signal may carry signals used for initial network acquisition and synchronization, such as a PSS, an SSS, a PBCH, and/or a PBCH DMRS. The SSBs may be used for beam selection, and the network node 110 may transmit multiple SSBs on multiple corresponding beams. The CSI-RS may carry information used for downlink channel estimation (e.g., downlink CSI acquisition), which may be used for scheduling, link adaptation, beam selection, and/or beam management, among other examples.

As shown in connection with reference number 504, the UE 120 may determine whether a mobility condition has been satisfied. The mobility condition may be based at least in part on one or more mobility parameters of the UE 120, such as how often the UE 120 moves (or does not move), a distance moved by the UE 120 relative to the network node 110 within a time period, a change of orientation of the UE 120, a rate of change of orientation of the UE 120, a device type of the UE 120 (e.g., if the UE 120 is a stationary type of UE), a path along which the UE 120 is moving, and/or how often a serving beam of the UE 120 changes, among other examples. Additional details regarding the mobility conditions of the UE 120 are described below in connection with FIG. 6.

In some aspects, the mobility condition may be based at least in part on a beam measurement associated with a beam used for communicating with the network node 110 via a serving cell. For example, the mobility condition may be based at least in part on a particular beam that is used for communication between the UE 120 and the network node 110 (such as a serving beam). In some aspects, the mobility condition may be based at least in part on a beam measurement on a particular beam, instead of being based on combined measurements (e.g., Layer 3 measurements) of all of the beams used by the UE 120 for communications. In some aspects, the mobility condition may be based at least in part on a band used for communicating with the network node 110. The mobility condition may be specific to one or more bands associated with the UE 120, such as an operating band specified by a wireless communication specification. A first operating band may be associated with one or more first mobility conditions whereas a second operating band may be associated with one or more second mobility conditions. For example, the first operating band may be associated with a first mobility condition (e.g., based on a number of movements or a total distance moved) for applying a relaxation criterion and the second operating band may associated with a second mobility condition for applying the relaxation criterion.

In some aspects, the UE 120 may determine whether the mobility condition is satisfied based at least in part on a Doppler shift associated with the one or more reference signals. A Doppler shift may be the result of a frequency offset or a fading of one or more signals (e.g., reference signals) caused by a rapid movement of the UE 120 and/or the network node 110. The UE 120 may determine whether the mobility condition is satisfied based at least in part on determining whether the Doppler shift of the one or more reference signals configured for a serving cell is below a threshold. For example, the UE may determine that the mobility condition is satisfied if the Doppler shift is less than (or equal to) a threshold, or may determine that the mobility condition is not satisfied if the Doppler Shift is greater than the threshold.

In some aspects, the UE 120 may determine whether the mobility condition is satisfied based at least in part on a number of times that the one or more reference signals are updated in a time window. For example, the UE 120 may determine that the mobility condition is satisfied based at least in part on the one or more reference signals being updated a number of times that satisfies a threshold. Alternatively, the UE 120 may determine that the mobility condition is not satisfied based at least in part on the one or more reference signals not being updated a number of that satisfies the threshold. In some aspects, a threshold and/or margin may be indicated by the network node in connection with the mobility condition. Additionally, or alternatively, the threshold and/or margin may be specified in a standard, such as a wireless communication standard promulgated by the Third Generation Partnership Project (3GPP).

In some aspects, the UE 120 may determine whether the mobility condition is satisfied based at least at least in part on one or more signal quality measurements. The one or more signal quality measurements may include an RSRP measurement, a signal-to-interference-plus-noise (SINR) measurement, and/or an RSRQ measurement, among other examples. In some aspects, the UE 120 may determine that the mobility condition is satisfied based at least at least in part on a signal quality measurement of the one or more reference signals being higher (e.g., by a margin) than a largest signal quality measurement of one or more other reference signals used by the UE 120. In some aspects, the UE 120 may determine that the mobility condition is satisfied based at least in part on a change in a difference, between a signal quality measurement of the one or more reference signals and a signal quality measurement of one or more other reference signals used by the UE 120, being smaller than a threshold. In some aspects, the UE 120 may determine that the mobility condition is satisfied based at least in part on a change in a difference, between a first signal quality measurement (e.g., a current quality measurement) of the one or more reference signals and a second signal quality measurement (e.g., a previous signal quality measurement) of the one or more reference signals, being smaller than a threshold. In some aspects, the signal quality measurement of the one or more reference signals may be the smallest signal quality measurement of the signal quality measurements of the one or more reference signals. For example, the UE 120 may determine that the mobility condition is satisfied based at least at least in part on a smallest signal quality measurement, of the signal quality measurements of the one or more reference signals, being higher (e.g., by a margin) than a largest signal quality measurement of one or more other reference signals used by the UE 120. In some aspects, the signal quality measurement of the one or more reference signals may be the largest (e.g., strongest) signal quality measurement, or the average signal quality measurement, of the signal quality measurements of the one or more reference signals.

In some aspects, the one or more reference signals (e.g., the one or more reference signals used by the UE 120) may not be quasi-colocated (QCL) with the one or more other reference signals. For example, the UE 120 may determine whether the mobility condition is satisfied based at least in part on a signal quality measurement of the one or more reference signals being higher than a largest signal quality measurement of one or more other reference signals used by the UE, wherein the one or more reference signals are not QCL with the one or more other reference signals. Additionally, or alternatively, the UE 120 may determine whether the mobility condition is satisfied based at least in part on a change in a difference, between a signal quality measurement of the one or more reference signals and a signal quality measurement of one or more other reference signals used by the UE, being smaller than a threshold, wherein the one or more reference signals are not QCL with the one or more other reference signals. In some aspects, the one or more reference signals may not be QCL with the one or more other reference signals based at least in part on the one or more reference signals having a different Doppler shift, Doppler spread, average delay, delay spread, or spatial receiving parameter, among other examples, than the one or more other reference signals.

As shown in connection with reference number 506, the UE 120 may determine whether to apply the relaxation criterion to the one or more reference signals. The relaxation criterion may indicate that the UE 120 is to perform beam measurement using the one or more reference signals less often than the UE 120 is otherwise configured to perform beam measurement (e.g., when the UE 120 is not applying the relaxation criterion) or less often than the UE 120 is currently performing beam measurement. In some aspects, performing beam measurements using one or more of the reference signals may include applying a multiplier to a configured periodicity of the one or more measurements. An example multiplier may include 2 (such that measurements occur half as often) or 4 (such that measurements occur one-quarter as often), among other examples. Applying the multiplier to the periodicity of the one or more measurements may reduce a frequency of the performing of the one or more measurements. Reducing a frequency of the performing of the one or more measurements may include reducing a number of times that the one or more measurements are performed within a time period. In some aspects, the relaxation criterion may indicate that the UE 120 should perform RLM and/or BFD using the one or more reference signals with less frequency. In some aspects, the UE 120 may skip one or more measurement occasions based at least in part on the relaxation criterion. For example, the UE 120 may skip M out of N measurement occasions (e.g., based at least in part on a mask or a bitmap), where M is less than N, and M and N are integer numbers. The network node 110 may indicate, to the UE 120, as the relaxation criterion, the values of and/or N.

In some aspects, the network node 110 may transmit, and the UE 120 may receive, an indication of whether the relaxation criterion is enabled or disabled for a beam used for communicating with the network node 110. Thus, the UE 120 may determine whether the relaxation criterion is enabled for a beam used for communicating with the network node 110, as described above, prior to applying the relaxation criterion to the one or more reference signals for the beam. Additionally, or alternatively, the network node 110 may transmit, and the UE 120 may receive, an indication of whether the relaxation criterion is enabled or disabled for a band (e.g., an operating band) used for communicating with the network node 110. For example, cells within the same band may share the same quasi co-location (QCL) relationship and may have similar SINR. Thus, the UE 120 may determine whether a band used for communicating with the network node 110, as described above, has the relaxation criterion enabled prior to applying the relaxation criterion to the one or more reference signals within the band. The indication of whether the relaxation criterion is enabled or disabled for the beam and/or the band may be received from the network node 110 in connection with reference number 502, or may be received as part of a separate communication (e.g., from the network node 110).

As shown in connection with reference number 508, the UE 120 may transmit, and the network node 110 may receive, one or more measurements using the one or more reference signals. In some aspects, the UE 120 may perform one or more measurements using one or more of the reference signals based at least in part on satisfying the mobility condition and based at least in part on the relaxation criterion. For example, the UE 120 may determine that the UE 120 moves less than a threshold (e.g., moves a fewer number of times or less than a threshold distance), and may perform one or more measurements using the one or more reference signals based at least in part on the relaxation criterion. In particular, as described below in connection with FIG. 6, the UE 120 may determine that the UE 120 moves less than a distance threshold with respect to the network node 110, and may therefore perform one or more measurements using the one or more reference signals based at least in part on the relaxation criterion. In some aspects, the UE 120 may perform the one or more measurements using the one or more reference signals based at least in part on determining that a first mobility condition associated with the performance of the RLM and a second mobility condition associated with the performance of the BFD are satisfied. In other words, the UE 120 may determine not to apply the relaxation criterion to the one or more reference signals unless both of a mobility condition associated with an RLM procedure and a mobility condition associated with a BFD procedure are satisfied. Otherwise, the UE 120 may not achieve much power saving, but may risk degradation in measurement performance.

Performing the beam measurements in accordance with the relaxation criterion may reduce a power consumption of the UE 120. As described above, performing RLM or BFD using one or more reference signals consumes battery power resources of the UE, thereby decreasing a battery life of the UE. Performing beam measurements in accordance with the relaxation criterion may reduce this power consumption. For example, the UE may apply the relaxation criterion to the one or more reference signals based at least in part on the UE satisfying one or more mobility conditions, and may perform beam measurements less often, thereby requiring less power resources of the UE. Since the UE is not moving around often, the UE can update the one or more reference signals used by the UE with less frequency without increasing (or significantly increasing) a likelihood that the UE will experience a beam failure.

As indicated above, FIG. 5 is provided as an example. Other examples may differ from what is described with regard to FIG. 5.

Figure 6:
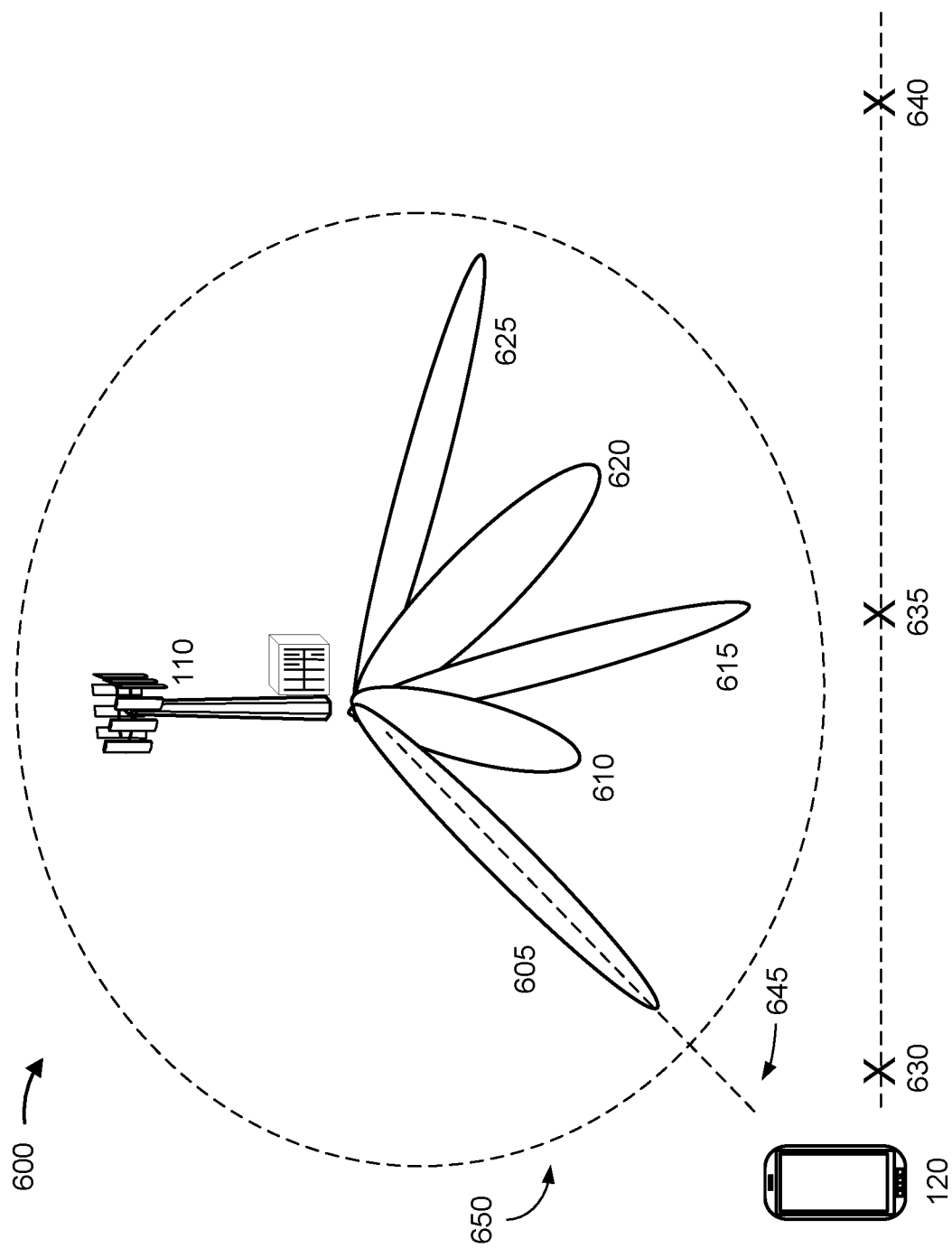
FIG. 6 is a diagram illustrating an example associated with a plurality of mobility conditions, in accordance with the present disclosure.

FIG. 6 is a diagram illustrating examples 600 of mobility conditions, in accordance with the present disclosure. As shown in FIG. 6, a UE, such as the UE 120, may be in communication with a network node, such as the network node 110. The UE 120 and the network node 110 may communicate using one or more beams. While FIG. 6 shows the UE 120 and the network node 110 communicating using any of the five beams 605, 610, 615, 620, and/or 625, the UE 120 and the network node 110 may communicate using any number of beams at any given time. For example, the network node 110 may use a first number of beams for communicating with a plurality of UEs, and the UE 120 may communicate with the network node 110 using a second number of beams that is equal to or less than the first number of beams.

In a first example, the UE 120 may move along the dashed line indicated by reference locations 630, 635, and 640. At a first time, when the UE is at the first location 630, the UE 120 may communicate with the network node 110 using the beam 605. However, at a second time, after the UE 120 has moved from the location 630 to the location 635, the UE 120 may need to switch to beam 615 in order to communicate with the network node 110. For example, the beam 605 may not support communications between the UE 120 and the network node 110 while the UE 120 is at the location 635 due to one or more characteristics of the beam 605, such as the directionality of the beam 605. At a third time, after the UE 120 has moved from the location 635 to the location 640, the UE 120 may (again) need to switch beams in order to communicate with the network node 110. For example, the UE 120 may need to switch to beam 620 and/or beam 625 in order to communicate with the network node 110 while the UE 120 is at the location 640. The UE 120 may select between beams 620 and 625 based at least in part on one or more characteristics of the beams, such as a signal strength of a signal received from the network node 110 over beams 620 and 625 at the location 640.

As described above, the UE 120 may be configured to apply a relaxation criterion to one or more reference signals based at least in part on the UE 120 satisfying one or more mobility conditions. The one or more mobility conditions may be based at least on part on a movement of the UE 120. In particular, the one or more mobility conditions may be based at least on part on a movement of the UE 120 relative to the network node 110. In this first example, the UE 120 may determine that the UE 120 does not satisfy the one or more mobility conditions since the UE 120 is moving relative to the network node 110 such that the UE 120 needs to change beams with some regularity. For example, the UE 120 may determine that the UE 120 needs to change beams greater than a threshold number of times. Therefore, the UE 120 may determine not to apply the relaxation criterion to the one or more reference signals (e.g., the one or more reference signals for performing RLM or BFD).

In a second example, the UE 120 may move along the dashed line indicated by reference number 645. In this example, the UE 120 is moving a distance from the network node 110, such as closer to the network node 110 or further away from the network node 110, along the dashed line indicated by reference number 645. However, the UE 120 may be moving relative to the network node 110 such that the beam 605 may continue to support communications between the UE 120 and the network node 110 (e.g., unless or until the UE 120 moves too great of a distance from the network node 110). Thus, the UE 120 may determine that the UE 120 satisfies the one or more mobility conditions, for example, since the UE 120 is moving relative to the network node 110 such that the UE 120 does not need to change beams at all or very often (e.g., as long as the SINR of the UE 120 satisfies a "good serving cell" criterion). For example, the UE 120 may determine that the UE 120 needs to change beams less than a threshold number of times within a time period. Therefore, the UE 120 may determine to apply the relaxation criterion to the one or more reference signals, causing the UE 120 to perform beam measurements with less frequency.

In a third example, the UE 120 may move along the dashed line indicated by reference number 650. In this example, the UE 120 is moving in a circular motion relative to the network node 110. Although the distance between the UE 120 and the network node 110 does not change (or does not change significantly) as the UE 120 moves, the UE 120 may change beams often, for example, to the directionality of the beams 605, 610, 615, 620, and 625. Thus, the UE 120 may determine that the UE 120 does not satisfy the one or more mobility conditions, for example, since the UE 120 needs to change beams greater than a threshold number of times within a time period. Therefore, the UE 120 may determine not to apply the relaxation criterion to the one or more reference signals.

As indicated above, FIG. 6 is provided as an example. Other examples may differ from what is described with regard to FIG. 6. For example, while FIG. 6 shows the UE 120 moving along one or more dashed lines, the UE 120 may move in any direction relative to the network node 110.

Figure 7:
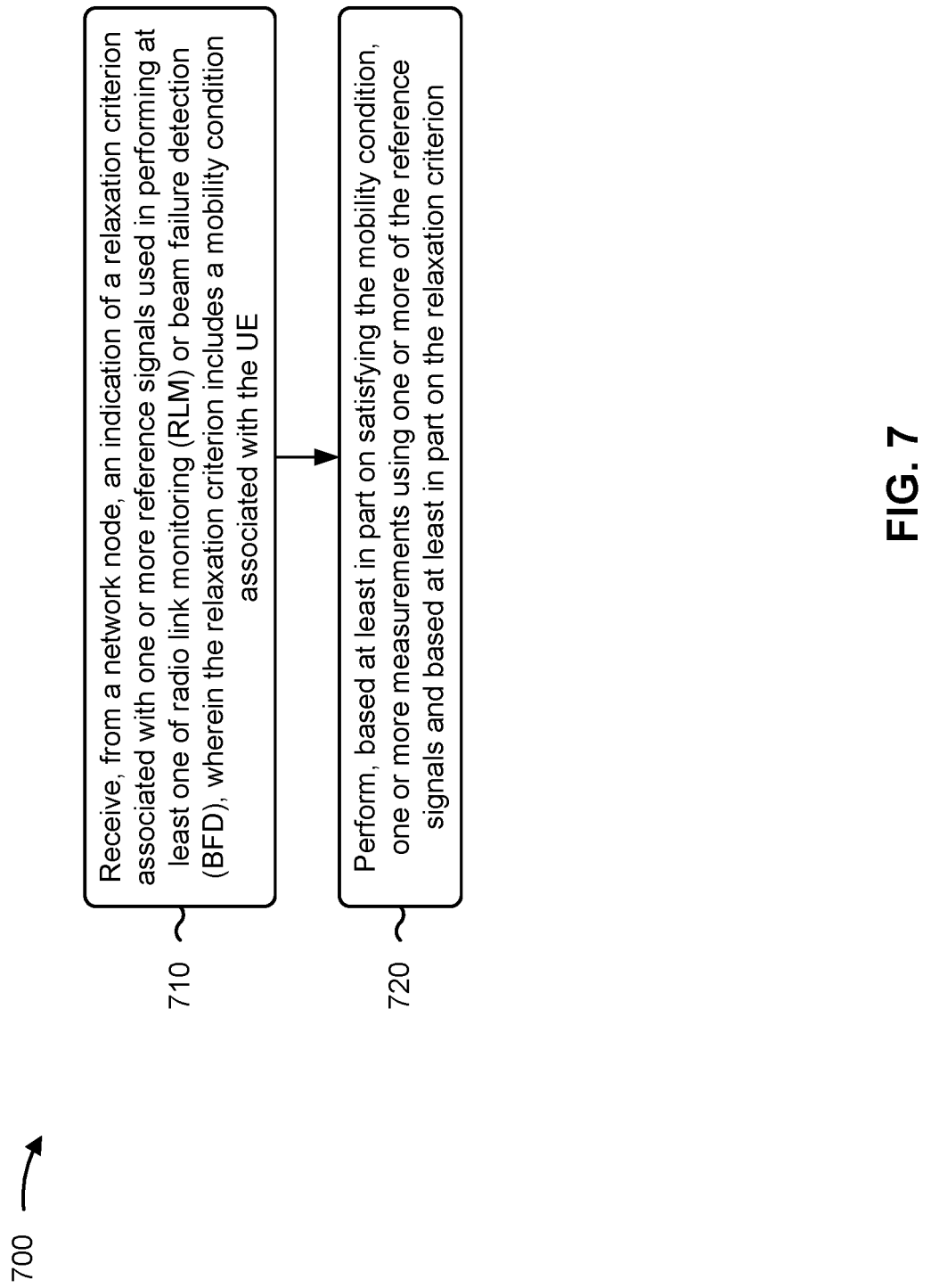
FIG. 7 is a diagram illustrating an example process associated with beam measurement relaxation criteria and configuration, in accordance with the present disclosure.

FIG. 7 is a diagram illustrating an example process 700 performed, for example, by a UE, in accordance with the present disclosure. Example process 700 is an example where the UE (e.g., UE 120) performs operations associated with beam measurement relaxation criteria and configuration.

As shown in FIG. 7, in some aspects, process 700 may include receiving, from a network node, an indication of a relaxation criterion associated with one or more reference signals used in performing at least one of RLM or BFD, wherein the relaxation criterion includes a mobility condition associated with the UE (block 710). For example, the UE (e.g., using communication manager 140 and/or reception component 902, depicted in FIG. 9) may receive, from a network node, an indication of a relaxation criterion associated with one or more reference signals used in performing at least one of RLM or BFD, wherein the relaxation criterion includes a mobility condition associated with the UE, as described above.

As further shown in FIG. 7, in some aspects, process 700 may include performing, based at least in part on satisfying the mobility condition, one or more measurements using one or more of the reference signals and based at least in part on the relaxation criterion (block 720). For example, the UE (e.g., using communication manager 140, determination component 908, and/or measurement component 910, depicted in FIG. 9) may perform, based at least in part on satisfying the mobility condition, one or more measurements using one or more of the reference signals and based at least in part on the relaxation criterion, as described above.

Process 700 may include additional aspects, such as any single aspect or any combination of aspects described below and/or in connection with one or more other processes described elsewhere herein.

In a first aspect, the mobility condition is based at least in part on a beam measurement associated with a beam used for communicating with the network node via a serving cell.

In a second aspect, alone or in combination with the first aspect, process 700 includes determining whether the mobility condition is satisfied for a band used for communicating with the network node.

In a third aspect, alone or in combination with one or more of the first and second aspects, the determination is specific to the band.

In a fourth aspect, alone or in combination with one or more of the first through third aspects, process 700 includes determining whether the mobility condition is satisfied based at least in part on a Doppler shift associated with the one or more reference signals.

In a fifth aspect, alone or in combination with one or more of the first through fourth aspects, process 700 includes determining whether the mobility condition is satisfied based at least in part a number of times that the one or more reference signals are updated in a time window.

In a sixth aspect, alone or in combination with one or more of the first through fifth aspects, process 700 includes determining whether the mobility condition is satisfied based at least in part on a signal quality measurement of the one or more reference signals being higher, by a margin, than a largest signal quality measurement of one or more other reference signals used by the UE.

In a seventh aspect, alone or in combination with one or more of the first through sixth aspects, the one or more reference signals may not be QCL with the one or more other reference signals.

In an eighth aspect, alone or in combination with one or more of the first through seventh aspects, process 700 includes determining whether the mobility condition is satisfied based at least in part on a change in a difference, between a signal quality measurement of the one or more reference signals and a signal quality measurement of one or more other reference signals used by the UE, being smaller than a threshold.

In a ninth aspect, alone or in combination with one or more of the first through eighth aspects, the one or more reference signals may not be QCL with the one or more other reference signals.

Ina tenth aspect, alone or in combination with one or more of the first through ninth aspects, process 700 includes determining whether the mobility condition is satisfied based at least in part on a change in a difference, between a first signal quality measurement of the one or more reference signals and a second signal quality measurement of the one or more reference signals, being smaller than a threshold.

In an eleventh aspect, alone or in combination with one or more of the first through tenth aspects, process 700 includes receiving an indication of whether the relaxation criterion is enabled or disabled for a beam used for communicating with the network node.

In a twelfth aspect, alone or in combination with one or more of the first through eleventh aspects, process 700 includes receiving an indication of whether the relaxation criterion is enabled or disabled for a band used for communicating with the network node.

In a thirteenth aspect, alone or in combination with one or more of the first through twelfth aspects, process 700 includes determining whether the mobility condition is satisfied based at least in part on information associated with a beam used for communicating with the network node.

In a fourteenth aspect, alone or in combination with one or more of the first through thirteenth aspects, process 700 includes determining whether the mobility condition is satisfied based at least in part on information associated with a band used for communicating with the network node.

In a fifteenth aspect, alone or in combination with one or more of the first through fourteenth aspects, process 700 includes performing, based at least in part on determining that a first mobility condition associated with the performance of the RLM and a second mobility condition associated with the performance of the BFD are satisfied, the one or more measurements using the one or more reference signals and based at least in part on the relaxation criterion.

In a sixteenth aspect, alone or in combination with one or more of the first through fifteenth aspects, performing the one or more measurements using one or more of the reference signals and based at least in part on the relaxation criterion comprises applying a multiplier to a periodicity of the one or more measurements.

In a seventeenth aspect, alone or in combination with one or more of the first through sixteenth aspects, applying the multiplier to the periodicity of the one or more measurements comprises reducing a frequency of the performing of the one or more measurements.

In an eighteenth aspect, alone or in combination with one or more of the first through seventeenth aspects, a power consumption of the UE is reduced based at least in part on the UE performing the one or more measurements based at least in part on the relaxation criterion.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
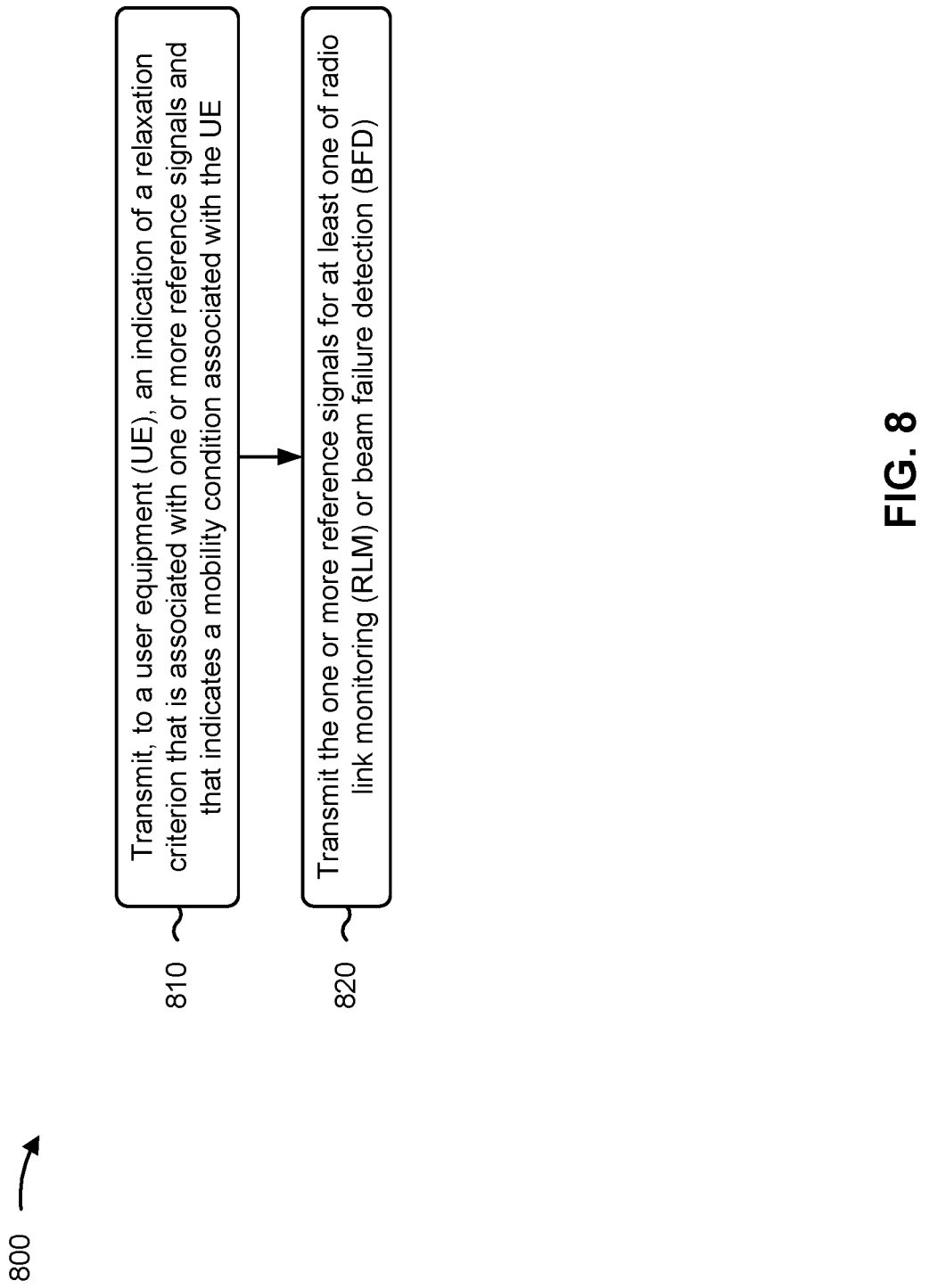
FIG. 8 is a diagram illustrating an example process associated with beam measurement relaxation criteria and configuration, in accordance with the present disclosure.

FIG. 8 is a diagram illustrating an example process 800 performed, for example, by a network node, in accordance with the present disclosure. Example process 800 is an example where the network node (e.g., network node 110) performs operations associated with beam measurement relaxation criteria and configuration.

As shown in FIG. 8, in some aspects, process 800 may include transmitting, to a UE, an indication of a relaxation criterion that is associated with one or more reference signals and that indicates a mobility condition associated with the UE (block 810). For example, the network node (e.g., using communication manager 150, transmission component 1004, and/or the configuration component 1008 depicted in FIG. 10) may transmit, to a UE, an indication of a relaxation criterion that is associated with one or more reference signals and that indicates a mobility condition associated with the UE, as described above.

As further shown in FIG. 8, in some aspects, process 800 may include transmitting the one or more reference signals for at least one of RLM or BFD (block 820). For example, the network node (e.g., using communication manager 150 and/or transmission component 1004, depicted in FIG. 10) may transmit the one or more reference signals for at least one of RLM or BFD, as described above.

Process 800 may include additional aspects, such as any single aspect or any combination of aspects described below and/or in connection with one or more other processes described elsewhere herein.

In a first aspect, the mobility condition is based at least in part on a beam measurement associated with a beam used for communications between the network node and the UE.

In a second aspect, alone or in combination with the first aspect, the mobility condition is based at least in part on a band used for communications between the network node and the UE.

In a third aspect, alone or in combination with one or more of the first and second aspects, the mobility condition is based at least in part on a Doppler shift associated with the one or more reference signals.

In a fourth aspect, alone or in combination with one or more of the first through third aspects, the mobility condition is based at least in part a number of times that the one or more reference signals are updated in a time window.

In a fifth aspect, alone or in combination with one or more of the first through fourth aspects, the mobility condition is based at least in part on a signal quality measurement of the one or more reference signals being higher, by a margin, than a largest signal quality measurement of one or more other reference signals used by the UE.

In a sixth aspect, alone or in combination with one or more of the first through sixth aspects, the one or more reference signals may not be QCL with the one or more other reference signals.

In seventh aspect, alone or in combination with one or more of the first through sixth aspects, the mobility condition is based at least in part on a change in a difference, between a signal quality measurement of the one or more reference signals and a signal quality measurement of one or more other reference signals used by the UE, being smaller than a threshold.

In an eighth aspect, alone or in combination with one or more of the first through seventh aspects, the one or more reference signals may not be QCL with the one or more other reference signals.

In a ninth aspect, alone or in combination with one or more of the first through eighth aspects, the mobility condition is based at least in part on a change in a difference, between a signal quality measurement of the one or more reference signals and a second signal quality measurement of the one or more reference signals, being smaller than a threshold.

In a tenth aspect, alone or in combination with one or more of the first through ninth aspects, process 800 includes transmitting an indication of whether the relaxation criterion is enabled or disabled for a beam used for communications between the network node and the UE.

In an eleventh aspect, alone or in combination with one or more of the first through tenth aspects, process 800 includes transmitting an indication of whether the relaxation criterion is enabled or disabled for a band used for communications between the network node and the UE.

In a twelfth aspect, alone or in combination with one or more of the first through eleventh aspects, the relaxation criterion comprises a multiplier to be applied to a periodicity of one or more measurements using the one or more reference signals.

In a thirteenth aspect, alone or in combination with one or more of the first through twelfth aspects, the multiplier reduces a frequency of the performance of the one or more measurements using the one or more reference signals.

In a fourteenth aspect, alone or in combination with one or more of the first through thirteenth aspects, the relaxation criterion is determined in order to reduce a power consumption of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
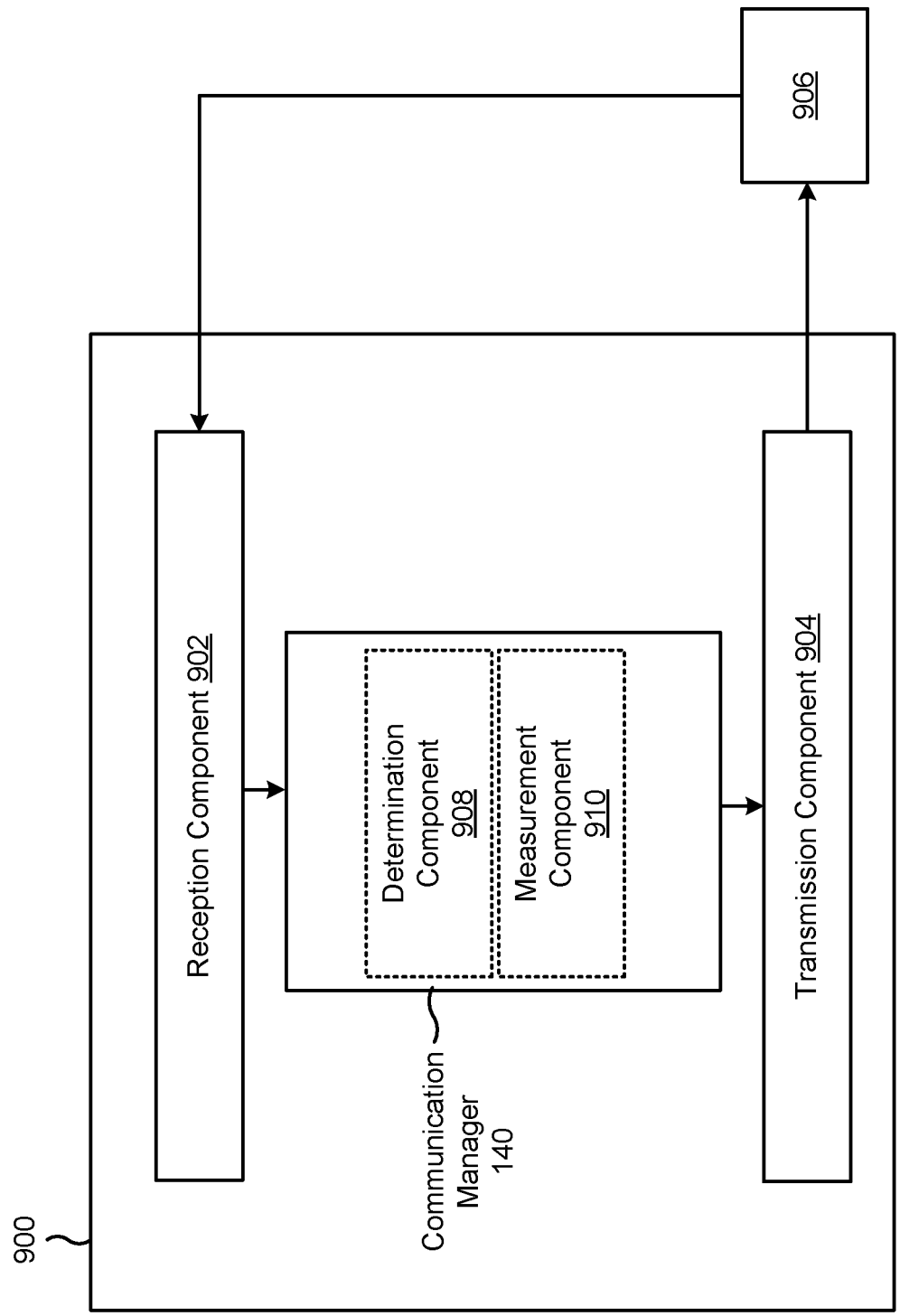
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 140. The communication manager 140 may include one or more of a determination component 908 or a measurement component 910, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a network node, an indication of a relaxation criterion associated with one or more reference signals used in performing at least one of RLM or BFD, wherein the relaxation criterion includes a mobility condition associated with the UE. The measurement component 910 may perform, based at least in part on satisfying the mobility condition, one or more measurements using one or more of the reference signals and based at least in part on the relaxation criterion.

The determination component 908 may determine whether the mobility condition is satisfied for a band used for communicating with the network node.

The determination component 908 may determine whether the mobility condition is satisfied based at least in part on a Doppler shift associated with the one or more reference signals.

The determination component 908 may determine whether the mobility condition is satisfied based at least in part a number of times that the one or more reference signals are updated in a time window.

The determination component 908 may determine whether the mobility condition is satisfied based at least in part on a signal quality measurement of the one or more reference signals being higher than a largest signal quality measurement of one or more other reference signals used by the UE.

The determination component 908 may determine whether the mobility condition is satisfied based at least in part on a change in a difference, between a signal quality measurement of the one or more reference signals and a signal quality measurement of one or more other reference signals used by the UE, being smaller than a threshold.

The determination component 908 may determine whether the mobility condition is satisfied based at least in part on a change in a difference, between a first signal quality measurement of the one or more reference signals and a second signal quality measurement of the one or more reference signals, being smaller than a threshold.

The reception component 902 may receive an indication of whether the relaxation criterion is enabled or disabled for a beam used for communicating with the network node.

The reception component 902 may receive an indication of whether the relaxation criterion is enabled or disabled for a band used for communicating with the network node.

The determination component 908 may determine whether the mobility condition is satisfied based at least in part on information associated with a beam used for communicating with the network node.

The determination component 908 may determine whether the mobility condition is satisfied based at least in part on information associated with a band used for communicating with the network node.

The measurement component 910 may perform, based at least in part on determining that a first mobility condition associated with the performance of the RLM and a second mobility condition associated with the performance of the BFD are satisfied, the one or more measurements using the one or more reference signals and based at least in part on the relaxation criterion.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
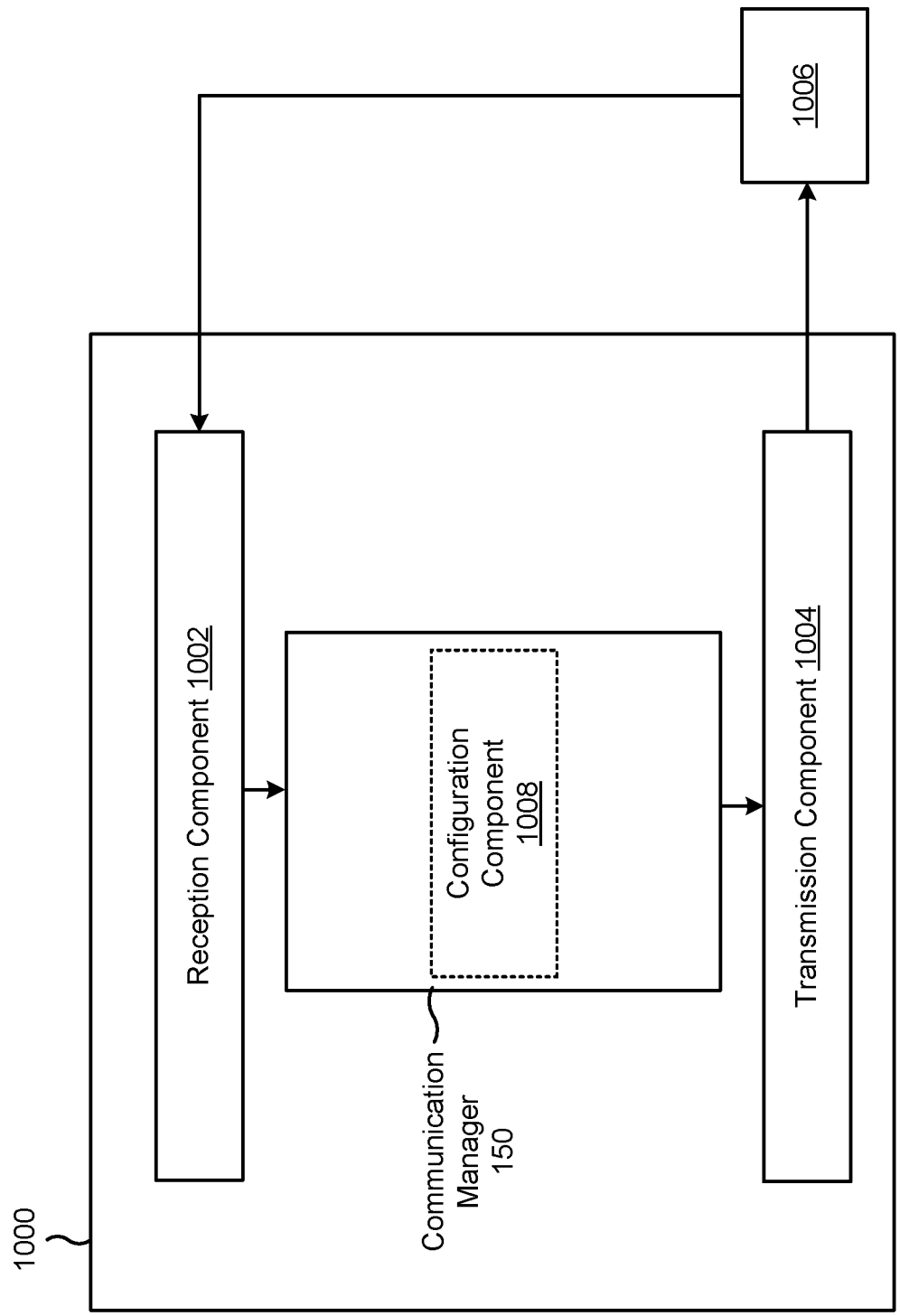
FIG. 10 is a diagram of an example apparatus for wireless communication, in accordance with the present disclosure.

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit, to a user equipment (UE), an indication of a relaxation criterion that is associated with one or more reference signals and that indicates a mobility condition associated with the UE. The transmission component 1004 may transmit the one or more reference signals for at least one of RLM or BFD.

The transmission component 1004 may transmit an indication of whether the relaxation criterion is enabled or disabled for a beam used for communications between the network node and the UE.

The transmission component 1004 may transmit an indication of whether the relaxation criterion is enabled or disabled for a band used for communications between the network node and the UE.

The configuration component 1008 may transmit configuration information, such as the relaxation criterion shown by reference number 502 in FIG. 5, or information indicating a mobility condition of the UE, among other examples.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 11:
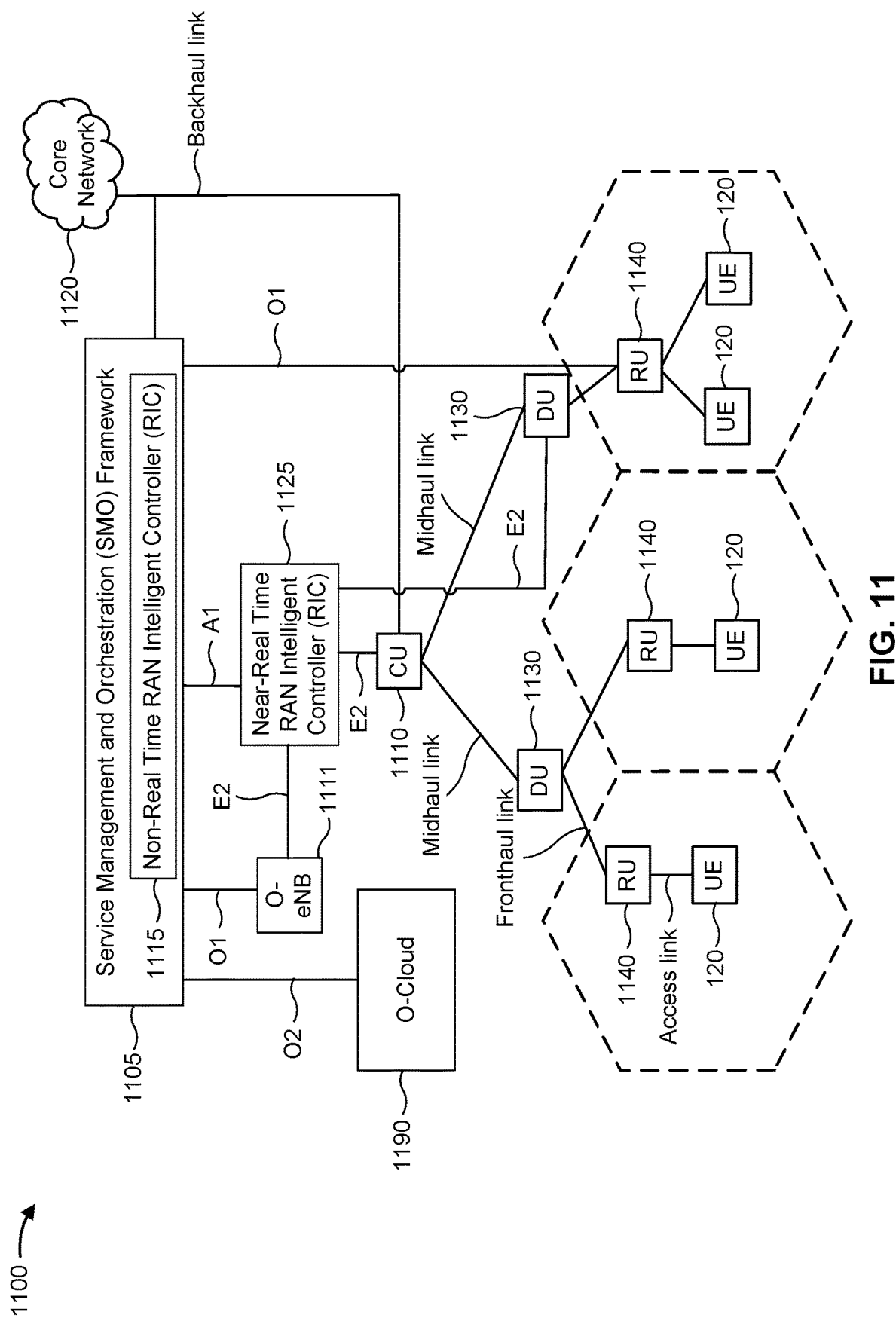
FIG. 11 is a diagram illustrating an example disaggregated base station architecture, in accordance with the present disclosure.

FIG. 11 is a diagram illustrating an example disaggregated base station architecture 1100, in accordance with the present disclosure. The disaggregated base station architecture 1100 may include a CU 1110 that can communicate directly with a core network 1120 via a backhaul link, or indirectly with the core network 1120 through one or more disaggregated control units (such as a Near-RT RIC 1125 via an E2 link, or a Non-RT RIC 1115 associated with a Service Management and Orchestration (SMO) Framework 1105, or both). A CU 1110 may communicate with one or more DUs 1130 via respective midhaul links, such as through F1 interfaces. Each of the DUs 1130 may communicate with one or more RUs 1140 via respective fronthaul links Each of the RUs 1140 may communicate with one or more UEs 120 via respective radio frequency (RF) access links. In some implementations, a UE 120 may be simultaneously served by multiple RUs 1140.

Each of the units, including the CUs 1110, the DUs 1130, the RUs 1140, as well as the Near-RT RICs 1125, the Non-RT RICs 1115, and the SMO Framework 1105, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1110 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 1110. The CU 1110 may be configured to handle user plane functionality (for example, Central Unit—User Plane (CU-UP) functionality), control plane functionality (for example, Central Unit—Control Plane (CU-CP) functionality), or a combination thereof. In some implementations, the CU 1110 can be logically split into one or more CU-UP units and one or more CU-CP units. A CU-UP unit can communicate bidirectionally with a CU-CP unit via an interface, such as the E1 interface when implemented in an O-RAN configuration.

The CU 1110 can be implemented to communicate with a DU 1130, as necessary, for network control and signaling.

Each DU 1130 may correspond to a logical unit that includes one or more base station functions to control the operation of one or more RUs 1140. In some aspects, the DU 1130 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1130 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 1130, or with the control functions hosted by the CU 1110.

Each RU 1140 may implement lower-layer functionality. In some deployments, an RU 1140, controlled by a DU 1130, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1140 can be operated to handle over the air (OTA) communication with one or more UEs 120. In some implementations, real-time and non-real-time aspects of control and user plane communication with the RU(s) 1140 can be controlled by the corresponding DU 1130. In some scenarios, this configuration can enable each DU 1130 and the CU 1110 to be implemented in a cloud-based RAN architecture, such as a vRAN architecture.

The SMO Framework 1105 may be configured to support RAN deployment and provisioning of non-virtualized and virtualized network elements. For non-virtualized network elements, the SMO Framework 1105 may be configured to support the deployment of dedicated physical resources for RAN coverage requirements, which may be managed via an operations and maintenance interface (such as an O1 interface). For virtualized network elements, the SMO Framework 1105 may be configured to interact with a cloud computing platform (such as an open cloud (O-Cloud) platform 1190) to perform network element life cycle management (such as to instantiate virtualized network elements) via a cloud computing platform interface (such as an O2 interface). Such virtualized network elements can include, but are not limited to, CUs 1110, DUs 1130, RUs 1140, non-RT RICs 1115, and Near-RT RICs 1125. In some implementations, the SMO Framework 1105 can communicate with a hardware aspect of a 4G RAN, such as an open eNB (O-eNB) 1111, via an O1 interface. Additionally, in some implementations, the SMO Framework 1105 can communicate directly with each of one or more RUs 1140 via a respective O1 interface. The SMO Framework 1105 also may include a Non-RT RIC 1115 configured to support functionality of the SMO Framework 1105.

The Non-RT RIC 1115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1125. The Non-RT RIC 1115 may be coupled to or communicate with (such as via an A1 interface) the Near-RT RIC 1125. The Near-RT RIC 1125 may be configured to include a logical function that enables near-real-time control and optimization of RAN elements and resources via data collection and actions over an interface (such as via an E2 interface) connecting one or more CUs 1110, one or more DUs 1130, or both, as well as an O-eNB, with the Near-RT RIC 1125.

In some implementations, to generate AI/ML models to be deployed in the Near-RT RIC 1125, the Non-RT RIC 1115 may receive parameters or external enrichment information from external servers. Such information may be utilized by the Near-RT RIC 1125 and may be received at the SMO Framework 1105 or the Non-RT RIC 1115 from non-network data sources or from network functions. In some examples, the Non-RT RIC 1115 or the Near-RT RIC 1125 may be configured to tune RAN behavior or performance. For example, the Non-RT RIC 1115 may monitor long-term trends and patterns for performance and employ AI/ML models to perform corrective actions through the SMO Framework 1105 (such as reconfiguration via an O1 interface) or via creation of RAN management policies (such as A1 interface policies).

As indicated above, FIG. 11 is provided as an example. Other examples may differ from what is described with regard to FIG. 11.

The following provides an overview of some Aspects of the present disclosure:

Aspect 1: A method of wireless communication performed by a user equipment (UE), comprising: receiving, from a network node, an indication of a relaxation criterion associated with one or more reference signals used in performing at least one of radio link monitoring (RLM) or beam failure detection (BFD), wherein the relaxation criterion includes a mobility condition associated with the UE; and performing, based at least in part on satisfying the mobility condition, one or more measurements using one or more of the reference signals and based at least in part on the relaxation criterion.

Aspect 2: The method of Aspect 1, further comprising receiving an indication of whether the relaxation criterion is enabled or disabled for a beam used for communicating with the network node.

Aspect 3: The method of Aspect 2, further comprising applying the relaxation criterion for the beam based at least in part on the indication indicating that the relaxation criterion is enabled.

Aspect 4: The method of any of Aspects 1-3, further comprising receiving an indication of whether the relaxation criterion is enabled or disabled for a band used for communicating with the network node.

Aspect 5: The method of Aspect 4, further comprising applying the relaxation criterion for the band based at least in part on the indication indicating that the relaxation criterion is enabled.

Aspect 6: The method of any of Aspects 1-5, further comprising determining whether the mobility condition is satisfied based at least in part on information associated with a beam used for communicating with the network node.

Aspect 7: The method of any of Aspects 1-6, further comprising determining whether the mobility condition is satisfied based at least in part on information associated with a band used for communicating with the network node.

Aspect 8: The method of any of Aspects 1-7, wherein performing the one or more measurements using one or more of the reference signals and based at least in part on the relaxation criterion comprises applying a multiplier to a periodicity of the one or more measurements.

Aspect 9: The method of Aspect 8, wherein applying the multiplier to the periodicity of the one or more measurements comprises reducing a frequency of the performing of the one or more measurements.

Aspect 10: The method of any of Aspects 1-9, wherein a power consumption of the UE is reduced based at least in part on the UE performing the one or more measurements based at least in part on the relaxation criterion.

Aspect 11: A method of wireless communication performed by a network node, comprising: transmitting, to a user equipment (UE), an indication of a relaxation criterion that is associated with one or more reference signals and that indicates a mobility condition associated with the UE; and transmitting the one or more reference signals for at least one of radio link monitoring (RLM) or beam failure detection (BFD).

Aspect 12: The method of Aspect 11, further comprising transmitting an indication of whether the relaxation criterion is enabled or disabled for a beam used for communications between the network node and the UE.

Aspect 13: The method of any of Aspects 11-12, further comprising transmitting an indication of whether the relaxation criterion is enabled or disabled for a band used for communications between the network node and the UE.

Aspect 14: The method of any of Aspects 11-13, wherein the relaxation criterion comprises a multiplier to be applied to a periodicity of one or more measurements using the one or more reference signals.

Aspect 15: The method of Aspect 14, wherein the multiplier reduces a frequency of a performance of the one or more measurements using the one or more reference signals.

Aspect 16: The method of any of Aspects 11-15, wherein the relaxation criterion is determined based at least in part on a reduced power consumption of the UE.

Aspect 17: An apparatus for wireless communication at a device, comprising a processor; memory coupled with the processor; and instructions stored in the memory and executable by the processor to cause the apparatus to perform the method of one or more of Aspects 1-10.

Aspect 18: A device for wireless communication, comprising a memory and one or more processors coupled to the memory, the one or more processors configured to perform the method of one or more of Aspects 1-10.

Aspect 19: An apparatus for wireless communication, comprising at least one means for performing the method of one or more of Aspects 1-10.

Aspect 20: A non-transitory computer-readable medium storing code for wireless communication, the code comprising instructions executable by a processor to perform the method of one or more of Aspects 1-10.

Aspect 21: A non-transitory computer-readable medium storing a set of instructions for wireless communication, the set of instructions comprising one or more instructions that, when executed by one or more processors of a device, cause the device to perform the method of one or more of Aspects 1-10.

Aspect 22: An apparatus for wireless communication at a device, comprising a processor; memory coupled with the processor; and instructions stored in the memory and executable by the processor to cause the apparatus to perform the method of one or more of Aspects 11-16.

Aspect 23: A device for wireless communication, comprising a memory and one or more processors coupled to the memory, the one or more processors configured to perform the method of one or more of Aspects 11-16.

Aspect 24: An apparatus for wireless communication, comprising at least one means for performing the method of one or more of Aspects 11-16.

Aspect 25: A non-transitory computer-readable medium storing code for wireless communication, the code comprising instructions executable by a processor to perform the method of one or more of Aspects 11-16.

Aspect 26: A non-transitory computer-readable medium storing a set of instructions for wireless communication, the set of instructions comprising one or more instructions that, when executed by one or more processors of a device, cause the device to perform the method of one or more of Aspects 11-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
receive, from a network node, an indication of a relaxation criterion associated with one or more reference signals used in performing at least one of radio link monitoring (RLM) or beam failure detection (BFD), wherein the relaxation criterion includes a mobility condition associated with the UE; and
perform, based at least in part on satisfying the mobility condition, one or more measurements using one or more of the reference signals and based at least in part on the relaxation criterion.

2. The apparatus of claim 1, wherein the one or more processors are further configured to receive an indication of whether the relaxation criterion is enabled or disabled for a beam used for communicating with the network node.

3. The apparatus of claim 2, wherein the one or more processors are further configured to apply the relaxation criterion for the beam based at least in part on the indication indicating that the relaxation criterion is enabled.

4. The apparatus of claim 1, wherein the one or more processors are further configured to receive an indication of whether the relaxation criterion is enabled or disabled for a band used for communicating with the network node.

5. The apparatus of claim 4, wherein the one or more processors are further configured to apply the relaxation criterion for the band based at least in part on the indication indicating that the relaxation criterion is enabled.

6. The apparatus of claim 1, wherein the one or more processors are further configured to determine whether the mobility condition is satisfied based at least in part on information associated with a beam used for communicating with the network node.

7. The apparatus of claim 1, wherein the one or more processors are further configured to determine whether the mobility condition is satisfied based at least in part on information associated with a band used for communicating with the network node.

8. The apparatus of claim 1, wherein the one or more processors, to perform the one or more measurements using one or more of the reference signals and based at least in part on the relaxation criterion, are configured to apply a multiplier to a periodicity of the one or more measurements.

9. The apparatus of claim 8, wherein the one or more processors, to apply the multiplier to the periodicity of the one or more measurements, are configured to reduce a frequency of the performing of the one or more measurements.

10. The apparatus of claim 1, wherein a power consumption of the UE is reduced based at least in part on the UE performing the one or more measurements based at least in part on the relaxation criterion.

11. An apparatus for wireless communication at a network node, comprising:
a memory; and
one or more processors, coupled to the memory, configured to:
transmit, to a user equipment (UE), an indication of a relaxation criterion that is associated with one or more reference signals and that indicates a mobility condition associated with the UE; and
transmit the one or more reference signals for at least one of radio link monitoring (RLM) or beam failure detection (BFD).

12. The apparatus of claim 11, wherein the one or more processors are further configured to transmit an indication of whether the relaxation criterion is enabled or disabled for a beam used for communications between the network node and the UE.

13. The apparatus of claim 11, wherein the one or more processors are further configured to transmit an indication of whether the relaxation criterion is enabled or disabled for a band used for communications between the network node and the UE.

14. The apparatus of claim 11, wherein the relaxation criterion comprises a multiplier to be applied to a periodicity of one or more measurements using the one or more reference signals.

15. The apparatus of claim 14, wherein the multiplier reduces a frequency of a performance of the one or more measurements using the one or more reference signals.

16. A method of wireless communication performed by a user equipment (UE), comprising:
receiving, from a network node, an indication of a relaxation criterion associated with one or more reference signals used in performing at least one of radio link monitoring (RLM) or beam failure detection (BFD), wherein the relaxation criterion includes a mobility condition associated with the UE; and
performing, based at least in part on satisfying the mobility condition, one or more measurements using one or more of the reference signals and based at least in part on the relaxation criterion.

17. The method of claim 16, further comprising receiving an indication of whether the relaxation criterion is enabled or disabled for a beam used for communicating with the network node.

18. The method of claim 17, further comprising applying the relaxation criterion for the beam based at least in part on the indication indicating that the relaxation criterion is enabled.

19. The method of claim 16, further comprising receiving an indication of whether the relaxation criterion is enabled or disabled for a band used for communicating with the network node.

20. The method of claim 19, further comprising applying the relaxation criterion for the band based at least in part on the indication indicating that the relaxation criterion is enabled.

21. The method of claim 16, further comprising determining whether the mobility condition is satisfied based at least in part on information associated with a beam used for communicating with the network node.

22. The method of claim 16, further comprising determining whether the mobility condition is satisfied based at least in part on information associated with a band used for communicating with the network node.

23. The method of claim 16, wherein performing the one or more measurements using one or more of the reference signals and based at least in part on the relaxation criterion comprises applying a multiplier to a periodicity of the one or more measurements.

24. The method of claim 23, wherein applying the multiplier to the periodicity of the one or more measurements comprises reducing a frequency of the performing of the one or more measurements.

25. The method of claim 16, wherein a power consumption of the UE is reduced based at least in part on the UE performing the one or more measurements based at least in part on the relaxation criterion.

26. A method of wireless communication performed by a network node, comprising:
 transmitting, to a user equipment (UE), an indication of a relaxation criterion that is associated with one or more reference signals and that indicates a mobility condition associated with the UE; and
 transmitting the one or more reference signals for at least one of radio link monitoring (RLM) or beam failure detection (BFD).

27. The method of claim 26, further comprising transmitting an indication of whether the relaxation criterion is enabled or disabled for a beam used for communications between the network node and the UE.

28. The method of claim 26, further comprising transmitting an indication of whether the relaxation criterion is enabled or disabled for a band used for communications between the network node and the UE.

29. The method of claim 26, wherein the relaxation criterion comprises a multiplier to be applied to a periodicity of one or more measurements using the one or more reference signals.

30. The method of claim 29, wherein the multiplier reduces a frequency of a performance of the one or more measurements using the one or more reference signals.

* * * * *